United States Patent
Zakrzewski

(10) Patent No.: US 8,023,443 B2
(45) Date of Patent: Sep. 20, 2011

(54) WIRELESS SENSOR SYSTEM

(75) Inventor: Radoslaw Romuald Zakrzewski, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 706 days.

(21) Appl. No.: 12/156,572

(22) Filed: Jun. 3, 2008

(65) Prior Publication Data

US 2010/0135263 A1    Jun. 3, 2010

(51) Int. Cl.
*G08C 17/00* (2006.01)
(52) U.S. Cl. .................. 370/311; 455/574; 713/300
(58) Field of Classification Search .................. None
See application file for complete search history.

(56) References Cited

U.S. PATENT DOCUMENTS

| | | | | |
|---|---|---|---|---|
| 5,799,256 | A | * | 8/1998 | Pombo et al. ............ 370/311 |
| 5,854,994 | A | * | 12/1998 | Canada et al. ........... 370/346 |
| 6,847,917 | B2 | | 1/2005 | Bechhoefer |
| 7,161,926 | B2 | | 1/2007 | Elson et al. |
| 7,339,957 | B2 | | 3/2008 | Hitt |
| 7,496,059 | B2 | | 2/2009 | Yoon |
| 2003/0007466 | A1 | * | 1/2003 | Chen ...................... 370/328 |
| 2003/0151513 | A1 | * | 8/2003 | Herrmann et al. ....... 370/310 |
| 2006/0128414 | A1 | | 6/2006 | Shida et al. |
| 2008/0049700 | A1 | | 2/2008 | Shah et al. |
| 2008/0070614 | A1 | | 3/2008 | Ogushi et al. |

FOREIGN PATENT DOCUMENTS

| | | |
|---|---|---|
| EP | 1 473 870 A2 | 11/2004 |
| WO | WO 2007/072193 A2 | 6/2007 |

OTHER PUBLICATIONS

H. Karl and A. Willig, *Protocols and Architectures for Wireless Sensor Networks*, John Wiley, 2005, Table of Contents and Index, 40 pp.
H. Zhai et al., "Performance analysis of IEEE 802.11 MAC protocols in wireless LANs," Wireless Communications and Mobile Computing, 2004; 4: 917-931.
M. Petrova et al., "Performance Study of IEEE 802.15.14 Using Measurements and Simulations," Wireless Communications and Networking Conference, WCNC, 2006. IEEE, vol. 1 (2006), pp. 487-492.

* cited by examiner

*Primary Examiner* — Chi Pham
*Assistant Examiner* — David S Andreasen
(74) *Attorney, Agent, or Firm* — Muirhead and Saturnelli, LLC

(57) ABSTRACT

Providing wireless communication between an access point and a wireless device includes the wireless device operating in a first reduced power mode for a first period of time, where the wireless device does not receive communications while operating in the first reduced power mode and includes the wireless device operating in a full power mode for a second period of time, where the wireless device transitions back into the first reduced power mode in response to there being no communication from the access point to the wireless device during the second period of time. The wireless device may be a wireless sensor. In response to the access point directing the wireless sensor to collect data at a particular collection time, the wireless sensor may enter the first reduced power mode for a time prior to the collection time.

27 Claims, 10 Drawing Sheets

US 8,023,443 B2

WIRELESS SENSOR SYSTEM

BACKGROUND OF THE INVENTION

1. Technical Field

This application relates to the field of electronic components, and more particularly to the field of communication and power management for wireless electronic components.

2. Description of Related Art

There are systems that use a plurality of sensors to collect data. For example, aircraft monitoring systems may use a plurality of sensors that provide sensed data to one or more central processors that use the data to assess the health of system components. See, for example, U.S. Pat. No. 6,847,917, which is incorporated by reference herein, which discloses determining a health indicator of a component using condition indicators (CIs) to parameterize characteristics about a component. The CI's are based on sensed data for the component.

Using wireless rather than fixed wired connections for aircraft sub-systems offers many advantages, such as lower weight, reduced complexity of wiring interfaces, simplified installation, and easier maintenance. For example, retrofitting new sub-systems into existing aircraft may become substantially easier and cheaper if no new wiring has to be designed and installed. The use of a large number of sensors to monitor aircraft's state may become more realistic if it does not lead to an increased amount of wiring. However, for wireless sensors to become a viable solution for aircraft and other applications, stringent performance requirements may need to be satisfied. Aircraft applications typically require very high reliability, i.e. data losses have to be very infrequent. The required probability of a lost data item may be several orders of magnitude lower than that typically considered by vendors of commercial wireless components. In addition, data latency requirements may be quite strict. Another issue to be addressed is the desire to limit battery replacement to very infrequent occasions when scheduled aircraft maintenance is performed, which makes energy saving important.

Accordingly, there is a need to develop solutions that address the issues noted above.

SUMMARY OF THE INVENTION

According to the system described herein, providing wireless communication between an access point and a wireless device includes the wireless device operating in a first reduced power mode for a first period of time, where the wireless device does not receive communications while operating in the first reduced power mode and includes the wireless device operating in a full power mode for a second period of time, where the wireless device transitions back into the first reduced power mode in response to there being no communication from the access point to the wireless device during the second period of time. The wireless device may be a wireless sensor. In response to the access point directing the wireless sensor to collect data at a particular collection time, the wireless sensor may enter the first reduced power mode for a time prior to the collection time. The wireless sensor may store collected data in a memory thereof. The access point may request the wireless sensor to transmit the data from the memory. The wireless sensor may enter a second reduced power mode in response to there being no communication from the access point during the full power mode for a predetermined number of cycles, the second reduced power mode including longer times between full power mode cycles than said first reduced power mode. Providing wireless communication between an access point and a wireless device may also include the wireless device providing time stamp information to the access point and the access point sending a clock adjustment command to the wireless device based on the time stamp information. The time stamp information may include a time the access point sends a command to the wireless device, a time the wireless device receives the command, a time the wireless device responds to the command, and a time the access point receives a response to the command. The wireless device may enter a second reduced power mode in response to there being no communication from the access point during the full power mode for a predetermined number of cycles, the second reduced power mode including longer times between full power mode cycles than said first reduced power mode. Providing wireless communication between an access point and a wireless device may also include the access point sending a command to the wireless device to cause the wireless device to transition into one of the reduced power modes. The wireless device may only transmit in response to a transmission from the access point. The wireless device may retransmit previously-transmitted data only in response to a retransmission command from the access point.

According further to the system described herein, computer software, provided in a computer-readable medium, facilitates wireless communication between an access point and a wireless device. The software includes executable code that causes the wireless device to operate in a first reduced power mode for a first period of time, where the wireless device does not receive communications while operating in the first reduced power mode and includes executable code that causes the wireless device to operate in a full power mode for a second period of time, wherein the wireless device transitions back into the first reduced power mode in response to there being no communication from the access point to the wireless device during the second period of time. The wireless device may be a wireless sensor and, in response to the access point directing the wireless sensor to collect data at a particular collection time, executable code may cause the wireless sensor to enter the first reduced power mode for a time prior to the collection time. The computer software may also include executable code that causes the wireless sensor to store collected data in a memory thereof. The computer software may also include computer software that causes the access point to request the wireless sensor to transmit the data from the memory. The computer software may also include executable code that causes the wireless sensor to enter a second reduced power mode in response to there being no communication from the access point during the full power mode for a predetermined number of cycles, the second reduced power mode including longer times between full power mode cycles than said first reduced power mode. The computer software may also include executable code that provides time stamp information to the access point and executable code that receives a clock adjustment command from the access point, wherein the clock adjustment command is provided based on the time stamp information. The time stamp information may include a time the access point sends a command to the wireless device, a time the wireless device receives the command, a time the wireless device responds to the command, and a time the access point receives a response to the command. The computer software may also include executable code that causes the access point to send a command to the wireless device to cause the wireless device to transition into one of the reduced power modes. The computer software may also include executable code that causes the wireless device to transmit only transmits in response to a transmission from the access point. The computer software may also include executable code that causes the wireless device to retransmit previously-transmitted data only in response to a retransmission command from the access point.

According further to the system described herein, a wireless sensor includes sensing components, a processor coupled to the sensing components, and a transceiver coupled to the processor. The wireless sensor operates in a first reduced power mode for a first period of time in which the wireless sensor does not receive communications while operating in the first reduced power mode, the wireless sensor operates in a full power mode for a second period of time, and wherein the wireless device transitions back into the first reduced power mode in response to there being no received wireless communication during the second period of time. The wireless sensor may also include a memory, coupled to the processor and the sensor components, where data collected by the wireless sensor is stored in the memory. The wireless sensor may enter a second reduced power mode in response to there being no received wireless communication during the full power mode for a predetermined number of cycles, the second reduced power mode including longer times between full power mode cycles than said first reduced power mode.

BRIEF DESCRIPTION OF THE DRAWINGS

Embodiments of the system are described with reference to the several figures of the drawings, in which.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be exaggerated or altered to facilitate an understanding of the system.

Figure 1:
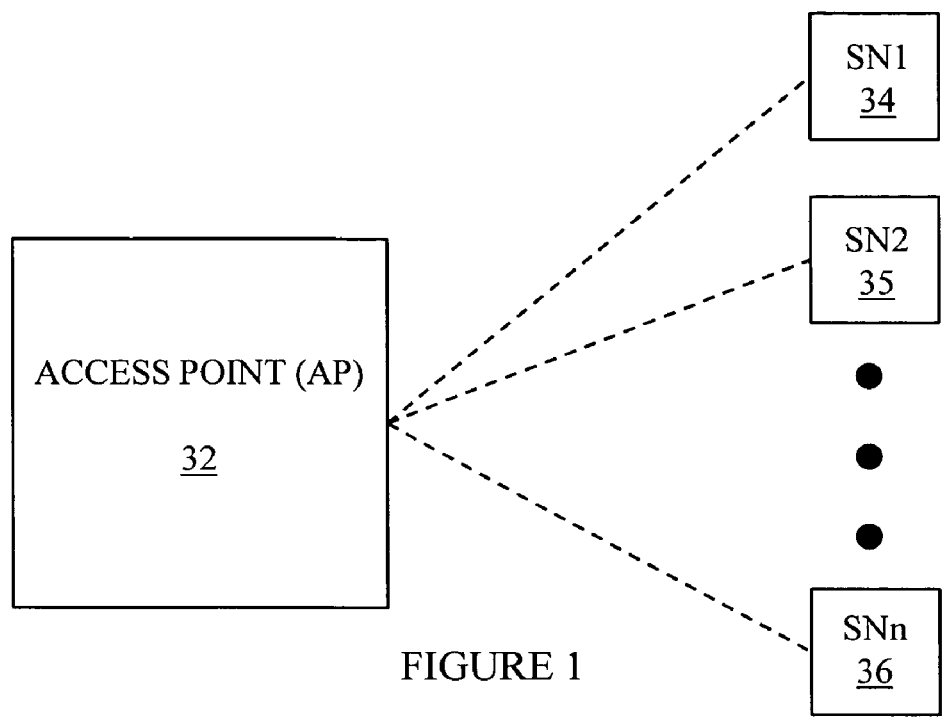
FIG. 1 is a schematic diagram illustrating an acquisition point (AP) and a plurality of sensors according to an embodiment of the system described herein.

Referring to FIG. 1, a diagram 30 illustrates a wireless acquisition point (AP) 32 and a plurality of wireless sensors SN1, SN2, . . . SNx 34-36. The AP 32 exchanges digital data with the sensors 34-36 including sensor data, status information, commands, etc. In an embodiment herein, the sensors 34-36 may be aircraft sensors used to measure aircraft parameters such as temperature, vibration, etc. However, the sensors 34-36 may represent any appropriate wireless data transceiver and thus, reference herein to the sensors 34-36 and/or a subset of the sensors 34-36 should be understood to include a general reference to a wireless data transceiver. Furthermore, there may be any appropriate number of sensors/data transceivers used to provide the functionality described herein. Similarly, although the system described herein is illustrated with the one AP 32, it is possible to use any appropriate number of other AP's to provide the functionality described herein. For example, it may be possible to provide redundant ones of the AP's and/or sensors that take over primary operation upon failure of a corresponding component.

The AP 32 and the sensors 34-36 communicate using any appropriate wireless frequency and/or protocol. For example, the system described herein may be implemented using the I.E.E.E. 802.15.4 protocol, possibly adapted to provide for higher data rates. Of course, other appropriate packet based digital data transmission protocols may-be used. The system described herein facilitates wireless digital data communication with variable sized or fixed sized data packets. In some cases, it may be useful to use variable sized data packets to facilitate adjusting the data packet size according to the quality of the wireless data link. A relatively good link favors larger packet sizes to improve data throughput while, conversely, a relatively bad link favors smaller packet sizes.

The AP 32 may be implemented using any appropriate hardware, such as conventional off-the-shelf processor and/or transceiver hardware capable of providing the functionality described herein. In an embodiment herein, the AP 32 may be powered externally so that, generally, operation of the AP 32 does not require significant conservation of power. The sensors 34-36, on the other hand, may have constraints that necessitate conserving power in connection with operation thereof.

In an embodiment herein, each of the sensors 34-36 communicates directly with the AP 32 and vice versa so that the sensors 34-36 do not communicate with each other. In addition, in an embodiment herein, each of the sensors 34-36 may be individually addressable by the AP 32 and the sensors 34-36 may not transmit anything unless specifically requested to do so by the AP 32. Such an arrangement reduces the likelihood of wireless-data collisions. Of course, special provisions may be made for initial configuration so that the AP 32 can learn the identity of new sensors. As described in more detail elsewhere herein, in some instances, one or more of the sensors 34-36 may enter a low power state (sleep) for a predetermined amount of time and then enter a different state to receive transmissions (requests) from the AP 32, if any.

Figure 2:
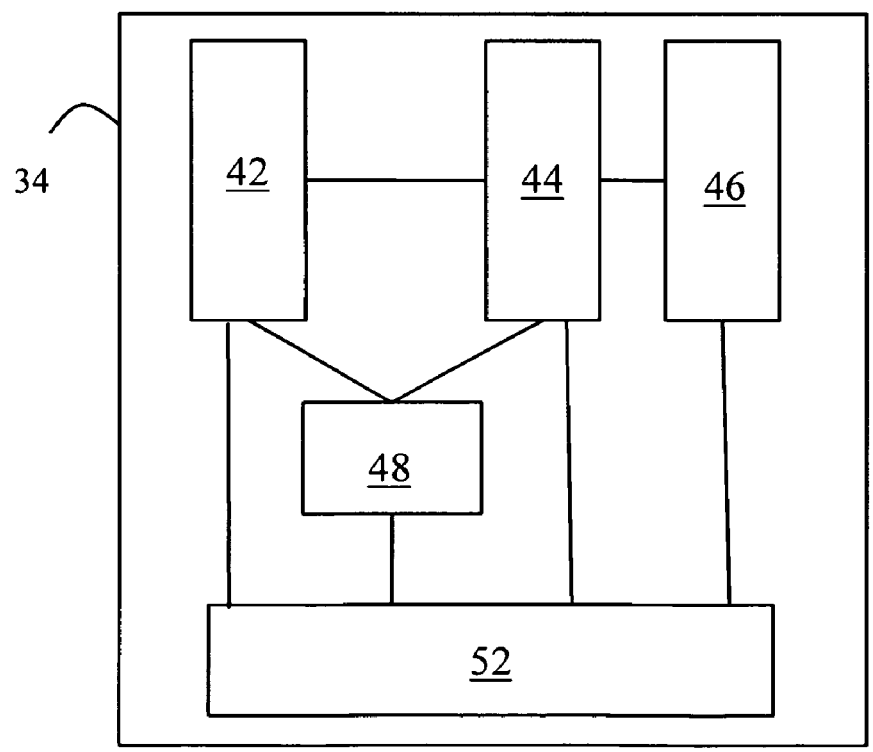
FIG. 2 is a schematic diagram illustrating a sensor and corresponding components thereof according to an embodiment of the system described herein.

Referring to FIG. 2, the sensor 34 is shown in more detail as including sensor components 42, a processor 44, a transceiver 46, a memory 48, and a power source 52. The sensor components 42 may provide conventional sensing functionality according to the particular application. For example, the sensor components 42 may include temperature sensing components, vibration sensing components, etc. Of course, in embodiments where other types of wireless data devices are used instead of sensors 34-36, then the sensor components 42 may be replaced with another type of data source/interface, as appropriate. Note that the transceiver 46 should be understood as including a single transceiver chip or a more complicated circuit/board that may include more components. Similarly, the processor 44 may be understood as including a single processor chip, or a more involved circuit/board. Accordingly, the components illustrated herein denote functional blocks that perform certain functions, rather than necessarily representing particular discrete components. In that regard, the system described herein may be implemented using a single chip that combines transceiver and processor functions, and possibly also includes some memory.

The processor 44 may be coupled to, and receive data from, the sensor components 42. The processor 44 may be any type of processor capable of providing the functionality described herein. The processor 44 may consume relatively little power and be capable of being placed in an idle (sleep) mode that consumes even less power or possibly even no power at all.

The transceiver 46 may be coupled to the processor 44 and handle wireless communication between the sensor 34 and the AP. In an embodiment herein, the transceiver 46 may communicate with the AP 32 using the I.E.E.E. 802.15.4 protocol, possibly adapted for higher data rates, or use any other appropriate protocol, including protocols that provide for high speed packet based digital data exchange. In some instances, it may be possible to use the I.E.E.E. 802.11 protocol with UDP. In some embodiments, the frequencies of 2.4 GHz and 5.8 GHz may be avoided in order to reduce the likelihood of interference from consumer electronics, such as cell phones, wireless data networks, etc. Of course, the system described herein does not depend upon the use of any particular communication protocol or class of protocols and does not depend on the use of any particular frequency or frequencies.

The memory 48 may be coupled to the sensor components 42 and the processor 44 and may be used to store data retrieved by the sensor components 42, temporary data generated by the processor 44 in connection with operation thereof, etc. In an embodiment herein, the memory may be volatile memory (e.g., semiconductor RAM) while the processor 44 uses non-volatile memory (not shown) for software thereof that includes processor instructions, constant data values used for execution, etc. Of course, any appropriate type of memory may be used.

The power source 52 is coupled to the sensor components 42, the processor 44, the transceiver 46, and the memory 48. The power source 52 may be a battery (rechargeable or not), a fuel cell, or any other component capable of generating electrical power for operation of electronic portions of the sensor 34. The system described herein conserves power of the sensors 34-36 (i.e., power from the power source 52) to minimize the frequency at which the power source 52 needs to be replaced, recharged, or otherwise renewed. Note, however, that it may be assumed that the AP 32 is coupled to an external power source and thus does not have similar power use issues.

Figure 3:
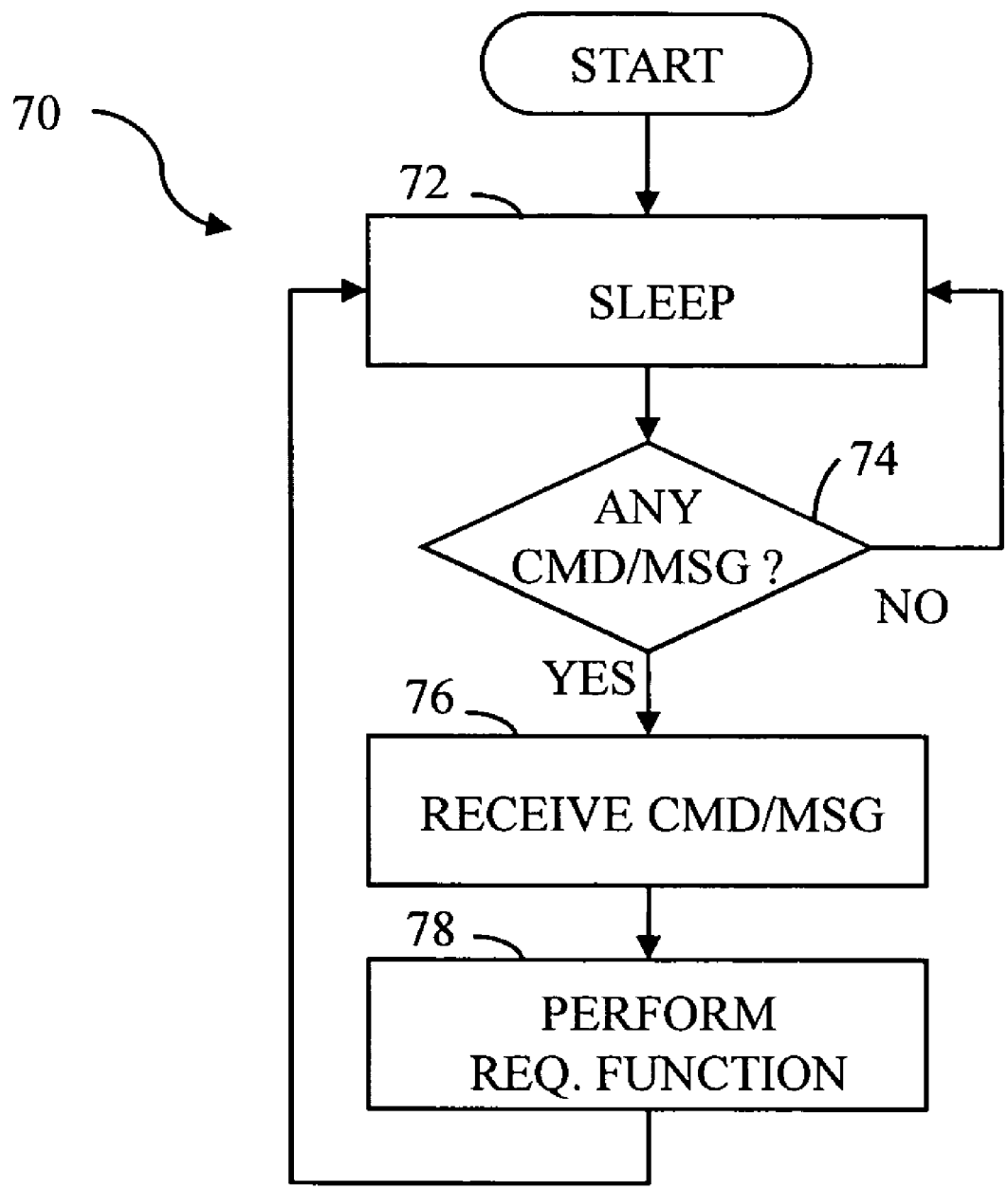
FIG. 3 is a flow chart illustrating basic operation of a sensor according to an embodiment of the system described herein.

Referring to FIG. 3, a flow chart 70 illustrates steps performed by each of the sensors 34-36 at the direction of the AP 32. Generally, a sensor operates in a reduced power usage state (sleeps) for a predetermined amount of time before waking up to see if the AP 32 is communicating therewith. If the AP 32 is not communicating with the sensor, the sensor goes back to sleep. There may be different sleep modes, different amounts of time a sensor spends sleeping each cycle, different amounts of time a sensor waits for communication from the AP 32, etc., all of which is explained in more detail elsewhere herein.

Processing for the flow chart 70 begins at a step 72 where the sensor sleeps. In an embodiment herein, the sensor sleeps by powering down some or all components except those necessary to maintain the sleep time for each cycle and to wake up the sensor when the sleep time expires. Since it is desirable to conserve power, then, ideally, as many components as possible may be powered down. In some embodiments, there may be two sleep modes: a shallow sleep mode where the volatile memory 48 is not powered down during the sleep cycle, thus retaining data, state information, etc., and a deep sleep mode where the memory 48 is powered down, thus causing any data stored therein to be lost. The sleep time for shallow sleep may be shorter than that for deep sleep. For example, the sleep time for shallow sleep may be two seconds while the sleep time for deep sleep may be forty seconds. Of course, other times may be used. The deep sleep mode may be used when the aircraft is not in use (e.g., on the ground in a hangar) while the shallow sleep mode may be used, for example, between data collection cycles during operation of the aircraft. Note, of course, that it may be possible to provide any number of different sleep modes having different characteristics, cycle times, etc.

Following the step 72 is a test step 74 where the sensor wakes up (leaves the sleep state) and determines if the AP 32 is communicating with the sensor. In an embodiment herein, the sensor remains awake for one millisecond to wait for a communication from the AP 32. Of course, a different amount of awake time may be used. If no communication comes while the sensor is awake, then control transfers from the test step 74 back to the step 72 to sleep for another cycle. Otherwise, control transfers from the test step 74 to a step 76 where the sensor receives the communication from the AP 32. Following the step 76 is a step 78 where the sensor takes whatever action is indicated by the communication received at the step 76. As discussed in more detail elsewhere herein, the actions may include providing status information, scheduling a sensor reading, returning sensor data, adjusting the sensor internal clock, etc. Following the step 78, control transfers back to the step 72, discussed above, for another iteration.

Figure 4:
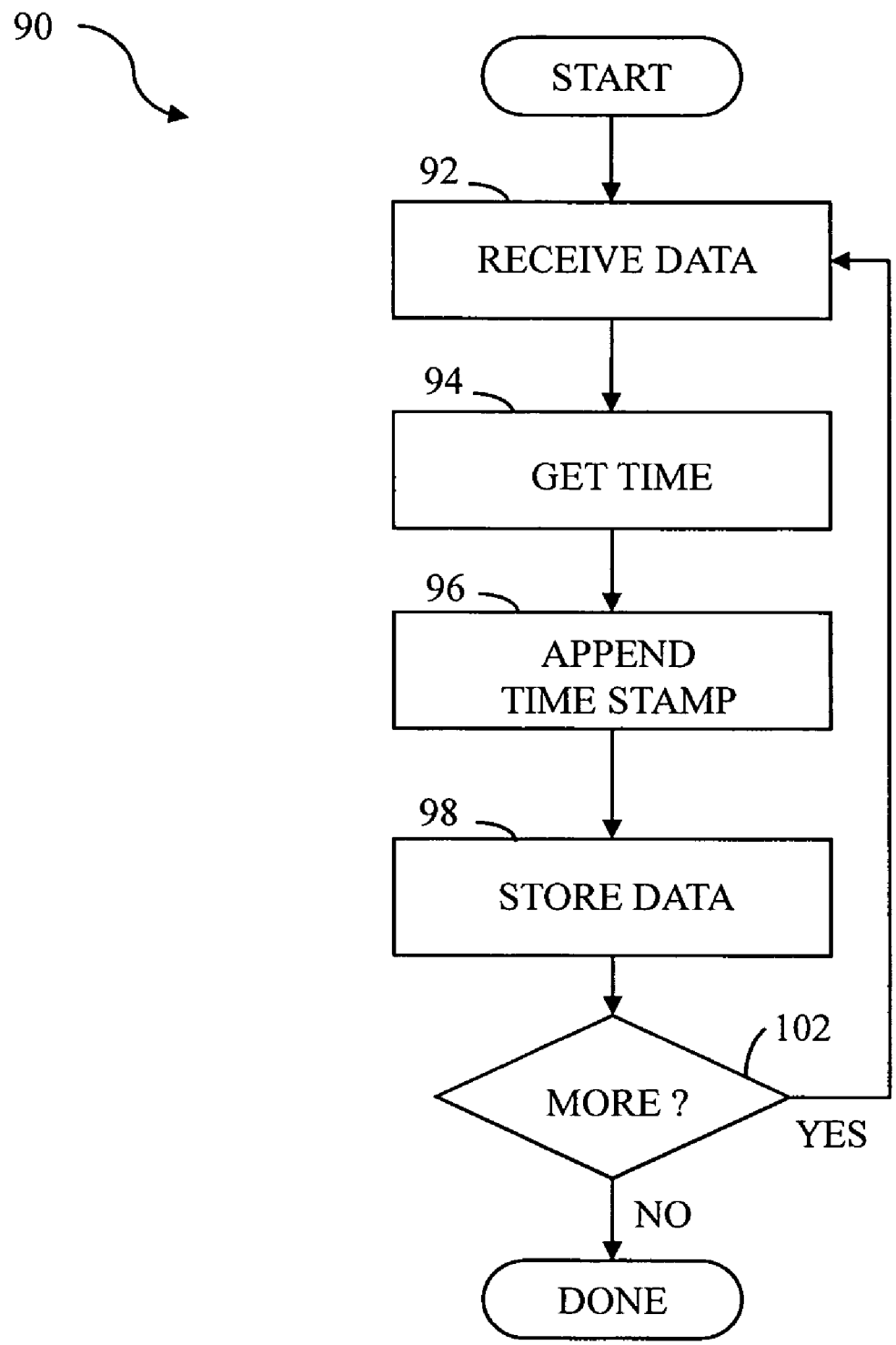
FIG. 4 is a flow chart illustrating a sensor receiving a message/command from an AP according to an embodiment of the system described herein.

Referring to FIG. 4, a flow chart 90 illustrates steps performed in connection with a sensor receiving a message/command from the AP 32. Processing begins at a first step 92 where the sensor receives the data (message/command) transmitted by the AP 32. Following the step 92 is a step 94 where the sensor obtains its own internal time information. Each of the sensors 34-36, and the AP 32, have an internal timing mechanism that may be adjusted, as described in more detail elsewhere herein. Following the step 94 is a step 96 where the time data obtained at the step 94 is appended to the received message. Use of the time information to determine when and how to adjust internal timing mechanisms is discussed in more detail elsewhere herein.

Following the step 96 is a step 98 where the received message is stored (i.e., in the memory 48). Following the step 98 is a test step 102 where it is determined if there is more data (for the command/message) to be received. In an embodiment herein, information may be transmitted using variable length data packets where the length may be adjusted based on the quality of the wireless communication link between the sensor and the AP 32. Thus, it may be possible for a particular command/message to span more than one data packet. If it is determined at the test step 102 that there is not more data to be received, then processing is complete. Otherwise, control transfers back to the step 92 to receive the additional data.

Figure 5:
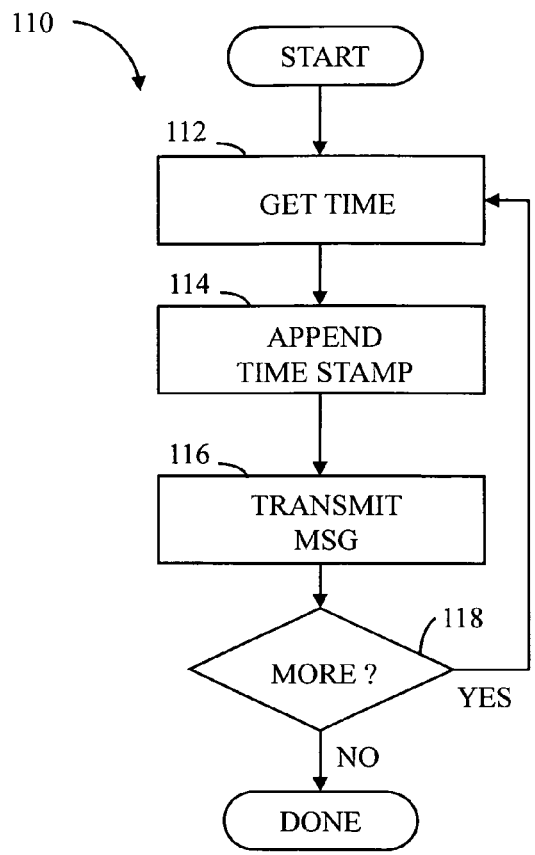
FIG. 5 is a flow chart of a sensor sending a message/data according to an embodiment of the system described herein.

Referring to FIG. 5, a flow chart 110 illustrates steps performed in connection with a sensor sending information (message/data) to the AP 32. Processing begins at a first step 112 where the sensor obtains time information from its own internal clock. Following the step 112 is a step 114 where the sensor appends the time information to the outgoing data. Just as adding time information to incoming data, adding time information to outgoing data may be used to determine when and how to adjust the internal time.

Following the step 114 is a step 116 where the message/data is transmitted to the AP 32 using, for example, the transceiver 46. Following the step 116 is a test step 118 where it is determined if there is more of the message to send. Just as with information transmitted by the AP 32 to the sensor, information transmitted from the sensor to the AP 32 may be transmitted using variable length data packets where the length may be adjusted based on the quality of the wireless communication link between the sensor and the AP 32 so that it is possible for a particular message to span more than one data packet. If it is determined at the test step 118 that there is not more data to transmit, then processing is complete. Otherwise, control transfers from the test step 118 back to the step 112 to transmit the additional data.

In an embodiment herein, it is possible for the AP 32 to send explicit commands to one or more of the sensors 34-36 to cause a sensor to enter the sleep mode and/or to transition from one sleep mode to another (e.g., shallow sleep to deep sleep). The AP 32 may indicate to the sensor the type (mode) of sleep and possibly even the amount of time to sleep. It may be desirable to have a sensor that receives a sleep command go to sleep immediately, and thus not indicate to the AP 32 that the sleep command was properly received. Accordingly, the sleep command may be sent from the AP 32 a number of times to increase the likelihood that the sleep command was properly received.

Figure 6:
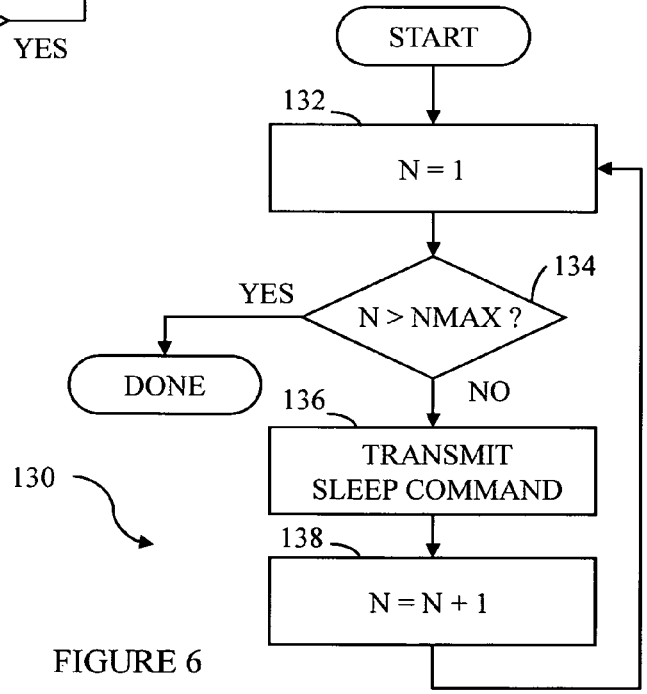
FIG. 6 is a flow chart illustrating an AP transmitting a sleep command to one or more sensors according to an embodiment of the system described herein.

Referring to FIG. 6, a flow chart 130 illustrates steps performed by the AP 32 in connection with the AP 32 sending a sleep command to one or more of the sensors 34-36. In an embodiment herein, the AP 32 may be able to simultaneously address multiple ones of the sensors 34-36 with a single sleep command transmission. In other embodiments, all commands transmitted by the AP 32 may only be directed to a single one of the sensors 34-36.

Processing for the flow chart 130 begins at a step 132 where a counter, N, is initialized to one. Following the step 132 is a test step 134 where it is determined if N exceeds a predetermined value, NMAX, that represents a number of times that the AP 32 will transmit the sleep command. In an embodiment herein, NMAX may be set to five, although other appropriate values may be used. In some instances, NMAX may be set by empirically observing sensor behavior and determining an acceptable value that is expected to be properly received by the sensors 34-36 in some number (percentage) of attempts. In some cases, NMAX may vary according to the identity of the particular one of the sensors 34-36 to which the sleep command is being directed.

If it is determined at the test step 134 that N is greater than NMAX, then processing is complete. Otherwise, control passes from the step 134 to a step 136 where the AP 32 transmits the sleep command to one or more of the sensors 34-36. In an embodiment herein, the sleep command may include the desired mode of sleep (e.g., shallow or deep) and/or may include a desired time for sleeping. For example, if the AP 32 desires a data from a particular one of the sensors 34-36 every X seconds, then the AP 32 may, after receiving data, direct the particular one of the sensors 34-36 to sleep for approximately X seconds (probably slightly less). In other instances, it is possible for the AP to send a specific time at which the sensor is to wake up based on the sensor's clock, which is synchronized with the AP's clock. Following the step 136 is a step 138 where the index variable, N, is incremented. Following the step 138, control transfers back to the test step 134 for another iteration.

Figure 7:
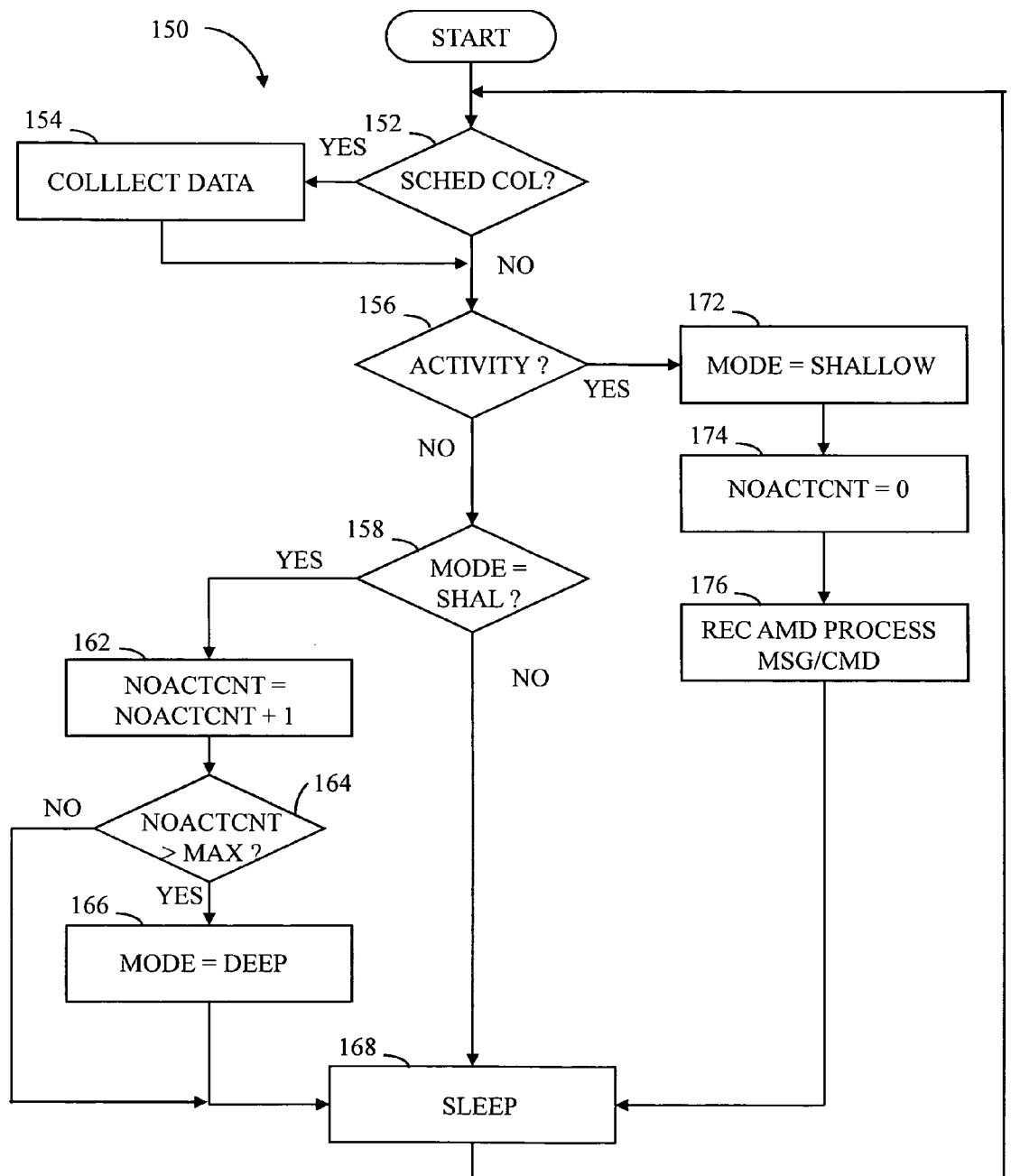
FIG. 7 is a flow chart illustrating processing performed by a sensor in connection with waking up according to an embodiment of the system described herein.

Referring to FIG. 7, a flow chart 150 illustrates steps performed by a sensor in connection with periodically waking up (leaving the sleep state). Processing begins at a first test step 152, where it is determined if it is time to perform a data collection. As discussed in more detail elsewhere herein, it is possible to schedule periodic data collections by the sensors 34-36 and/or a subset thereof. Accordingly, if it is determined at the test step 152 that it is time for data collection by the sensor, then control passes from the test step 152 to a step 154 where the data is collected. Of course, collecting the data at the step 154 depends on the type of sensor, the specific data requested/needed, etc.

Following the step 154, or following the step 152 if there is no sensor data collection scheduled, is a test step 156 where it is determined if there is any communication activity from the AP 32 directed at the sensor. As discussed elsewhere herein, the sensor remains awake for a predetermined amount of time waiting for communication from the AP 32. If it is determined at the step 156 that there is no communication activity from the AP 32 directed to the sensor, then control transfers from the step 156 to a test step 158 where it is determined if the sensor is currently in the shallow sleep mode. As discussed in more detail elsewhere herein, in some embodiments the sensors 34-36 may have two sleep modes: a shallow sleep mode where the sleep cycle time is relatively short and a deep sleep mode where the sleep cycle time is relatively long.

If it is determined at the test step 158 that the sensor is currently in a shallow sleep mode, then control transfers from the test step 158 to a step 162 where a no activity counter variable, NOACTCNT, is incremented. The NOACTCNT variable determines the number of successive cycles for which the sensor did not detect any communication from the AP 32 directed to the sensor. Following the step 162 is a test step 164 where it is determined if NOACTCNT exceeds a predetermined limit for the number of times a sensor in a shallow sleep mode can detect no activity before placing itself to deep sleep mode. In an embodiment herein, the limit used at the test step 164 corresponds to W seconds, but of course other values may be used. If it is determined at the step 164 that NOACTCNT is greater than the predetermined limit, then control transfers from the step 164 to a step 166 where the sensor places itself in a deep sleep mode.

Following the step 166 or the step 164 if NOACTCNT is not greater than the limit is a step 168 where the sensor sleeps. The amount of time that the sensor sleeps at the step 168 depends, at least in part, on whether the sensor is in a deep sleep mode or a shallow sleep mode (or possibly some other mode). Furthermore, in some embodiments, the AP 32 may direct the sensor to sleep for a specific amount of time and/or until a particular time (e.g., until it is time to collect more sensor data). Note that the step 168 is also reached from the step 158 if it is determined at the step 158 that the sensor is not in the shallow sleep mode. Following the step 168, control transfers back to the step 152, discussed above, for another iteration.

If it is determined at the step 156 that the AP 32 has sent a command/message to the sensor, then control transfers from the step 158 to a step 172 where the sensor is explicitly placed in the shallow sleep mode. Note that if the sensor is already in the shallow sleep mode, then the processing at the step 172 will not affect the state of the sensor but that if the sensor was in a deep sleep mode (or some other mode) prior to the step 172, then the processing at the step 172 changes the sleep mode of the sensor. Following the step 172 is a step 174 where the NOACTCNT variable is set to zero. Following the step 174 is a step 176 where the command/message from the AP 32 is received and processed, as described in more detail elsewhere herein. Following the step 176, control transfers to the step 168, discussed above, to cause the sensor to sleep. As mentioned elsewhere herein, it is useful to have the AP 32 time synchronized with the sensors 34-36. Accordingly, the AP 32 may monitor the clock skew between the AP 32 and each of the sensors 34-36 using the time stamps appended to messages. In an embodiment herein, each message sent by any node is time-stamped at least twice—when sending out, as close as possible to the actual transmission, and after receiving it, as soon as possible after the actual arrival. The receiving node records both time stamps. In addition, each message sent by a sensor to the AP 32 may include the two time stamps associated with the most recent command message received from the AP 32. Because each of the sensors 34-36 may acknowledge every command from the AP 32 (except, possibly, for the sleep commands) the AP 32 continually receives timing data from each of the sensors 34-36. Accordingly, the AP 32 may use the timing data to estimate the current clock discrepancy between each of the sensors 34-36 and the AP 32.

In an embodiment herein, the AP 32 attaches the outgoing time stamp $t_1$ to a command message sent to one of the sensors 34-36. The time $t_1$ is measured according to the clock of the AP 32. Following that, the receiving one of the sensors 34-36 applies an incoming time stamp $t_2$ to the received message, according to the clock of the receiving one of the sensors 34-36. The two time stamp values, $t_1$ and $t_2$, are then attached to the message that the sensor sends in response to the command of the AP 32. In addition, an outgoing time stamp $t_3$ (according to the clock of the sensor) and an incoming time stamp $t_4$ (according to the clock of the AP 32) are applied to the response message. Thus, upon receipt of the response from the sensor, the AP 32 is in possession of four time stamp values: $t_1$, $t_2$, $t_3$, and $t_4$ that allow estimating the instantaneous skew (offset) between the clock of the sensor and the clock of the AP 32, as follows:

$$\text{Skew}=(t_4+t_1-t_3-t_2)/2$$

Note that processing delays may include random jitter and cannot be guaranteed to be equal on the AP 32 and sensors 34-36 or to be constant throughout the system operation. Accordingly, in an embodiment herein, skew values may be calculated and averaged over multiple measurements. In some embodiments, clock drift rate may also be calculated using any of the appropriate tracking algorithms, including well-know conventional tracking algorithms. In an embodiment herein, the sensors 34-36 may perform the clock adjustments and acknowledge clock adjustment commands just like any other command from the AP 32. Note that, no clock adjustments may be performed by any of the sensors 34-36 unless a specific command arrives from the AP 32 that contains the corrections values.

Note that the clock skew calculations need not be performed immediately after the time stamp information is collected. Instead, the AP 32 may store the time stamp data for later use. For example, when data transfer is in progress, the AP 32 may be too busy to perform the synchronization calculations. In such a case, after data transfer is finished, the AP 32 may calculate filtered skew and drift rate estimates for each of the sensors 34-36 and decide which clocks of which of the sensors 34-36 need to be adjusted.

In some embodiments, if the observed clock rates of the sensors 34-36 differ significantly between each other, the AP 32 may use the currently estimated values to adjust the sampling rates for data acquisition. For example, if the clock of the sensor 34 is determined to be significantly faster than the clock of the sensor 35, then the AP 32 may command the sensor 34 to sample data with a slower rate than the sensor 35, so that the resulting true sampling rates are almost identical. Whether this approach is advisable may depend on observed clock rate differences and on granularity of the sampling rate control. Note also that this assumes that the A/D converter uses the same clock as the microcontroller that performs time stamping. If separate circuitry is used for sensor data sampling, clock rates derived from time stamps may not be used for sampling rate control.

When the AP 32 detects that the skew of a particular one of the sensors 34-36 is unacceptable large, the AP 32 may resynchronize the clock of the particular one of the sensors 34-36. Note that the threshold for the amount of clock skew that may cause a resynchronization of a sensor clock is an operational parameter that may depend upon a variety of functional factors and possibly empirical observations to find an acceptable value.

Figure 8:
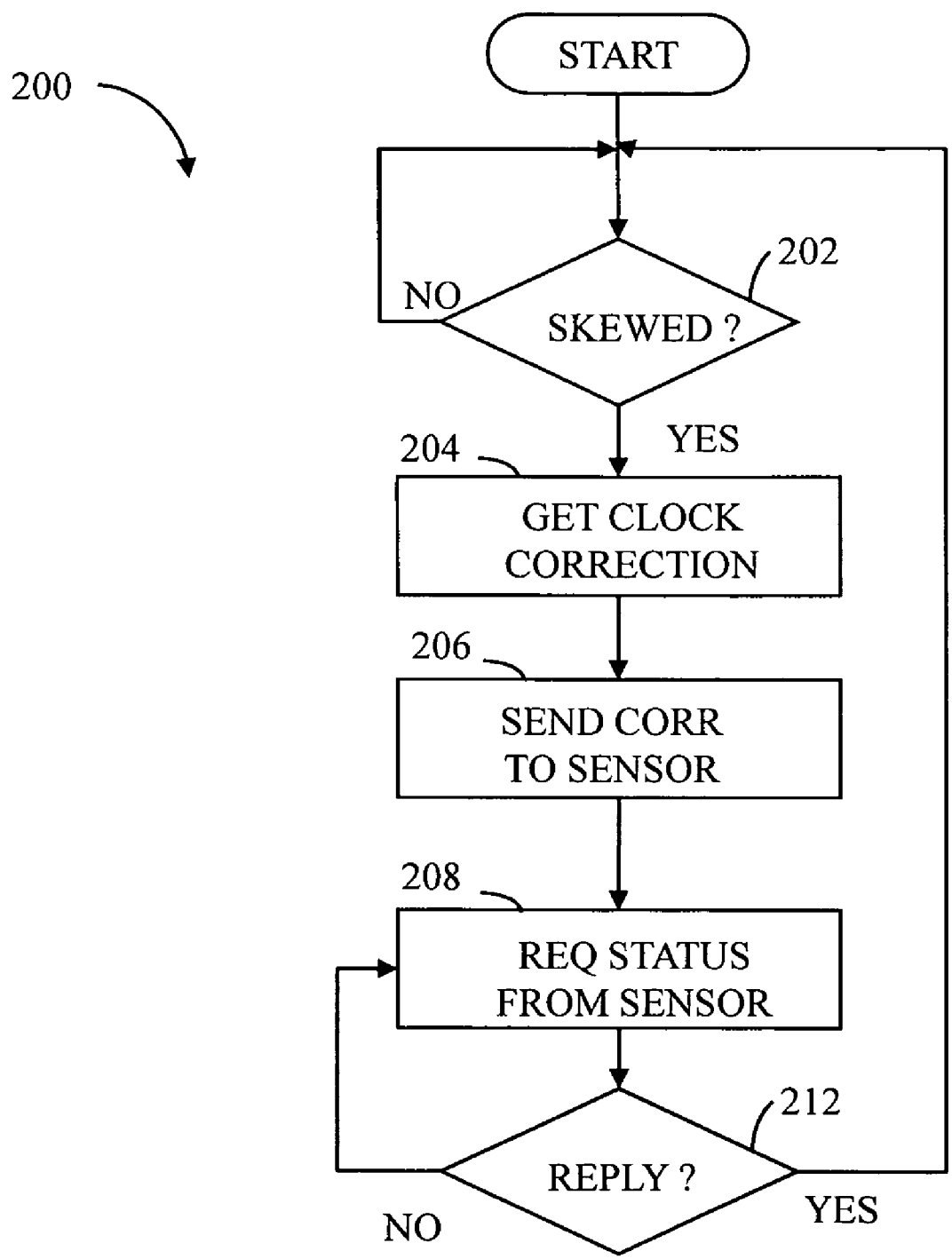
FIG. 8 is a flow chart illustrating processing performed by an AP in connection with resynchronizing a sensor's time clock according to an embodiment of the system described herein.

Referring to FIG. 8, a flow chart 200 illustrates steps performed in connection with the AP 32 performing time synchronization with each one of the sensors 34-36. Processing begins at a first test step 202 where the AP 32 determines if the sensor clock is skewed. As discussed elsewhere herein, the AP 32 may detect a clock skew using the time stamps provided on messages/data transmitted between the AP 32 and the sensor. Any appropriate technique/parameters may be used to detect clock skew. If it is determined at the test step 202 that the clock skew does not exceed a predetermined value, then control loops back on the test step 202 to continue polling for clock skew. In some embodiments, there may be a delay introduced prior to the loop back to the step 202. In other embodiments, processing may be complete if no clock skew is detected at the step 202 because the steps illustrated by the flow chart 200 would form a clock skew routine that is executed once each time when call by other processes of the AP 32.

If it is determined at the step 202 that the clock of a sensor is skewed, the control transfers from the step 202 to a step 204 where the AP determines an appropriate time correction In some instances, the AP determines an amount of correction at the step 204 corresponding to an amount that the sensor should add or subtract to adjust the sensor's clock. Following the step 204 is a step 206 where a clock synchronization command is sent by the AP 32 to the sensor. The clock synchronization command may include the correction amount obtained at the step 204.

Following the step 206 is a step 208 where the AP 32 sends a status request to the sensor. Note that a response to the status request may include time stamps that are used to detect clock skew. Following the step 208 is a test step 212 where it is determined if the AP 32 has received a response to the status request. If not, then control transfers back to the step 208 to resend a status request. Otherwise, if it is determined at the test step 212 that the AP 32 has received a response to the status request sent at the step 208, then control transfers from the step 212 back to the step 202 to begin another iteration.

In some instances, a sensor may receive the same command/message a number of times from the AP 32 because the AP 32 is not receiving the response (acknowledgement) from the sensor due to poor data link quality from the sensor to the AP 32. Similarly, the AP 32 may send the same command/message a number of times to a sensor before the command/message is properly received by the sensor due to poor data link quality from the AP 32 to the sensor. It is useful to be able to distinguish between the two different cases to determine whether to adjust the transmit power of the sensor, the transmit power of the AP, or both. Accordingly, in some instances each message/command provided by the AP 32 may be assigned a unique numeric identifier (e.g., serial number) so that a sensor can distinguish between different instances of commands/messages from the AP 32. In addition, a sensor may use the identifier to keep track of the number of times it sees each particular command/message. Note also that there may be other parameters that control packet delivery rates, such as the number of repeated retransmissions of commands or sensors responses. In some embodiments, if the AP 32 detects that most commands sent by the AP 32 are lost, the AP 32 may want to increase the number of retransmission instead of increasing transmit power. For different transceivers, the energy trade-offs may be different.

Figure 9:
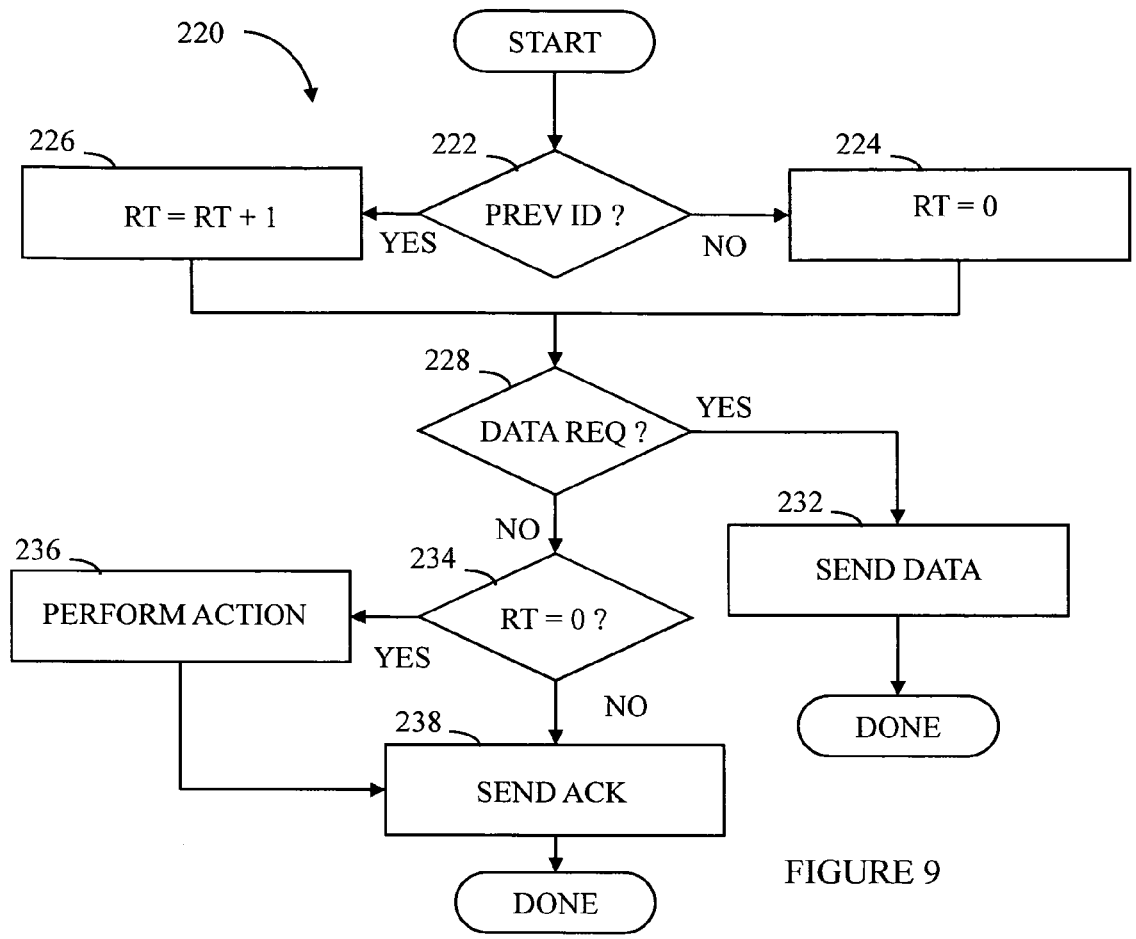
FIG. 9 is a flow chart illustrating processing performed by a sensor in connection with receiving a message/command according to an embodiment of the system described herein.

Referring to FIG. 9, a flow chart 220 illustrates steps performed by a sensor in connection with providing information regarding communication data link quality between the sensor and the AP 32. Processing begins at a first test step 222 where the sensor determines if the command/message that has been received had been previously received. The test at the step 222 examines the identifier (serial no.) of the received command/message. As discussed elsewhere herein, the AP 32 assigns a unique identifier to each command/message. Thus, if the identifier of the received command/message is the same as that of a command/message already received, then it is the same command/message being resent by the AP 32.

If it is determined at the test step 222 that the identifier of the received message/command does not match that of one already received, then control transfers from the test step 222 to a step 224 where a retry count variable (RT) associated with the identifier is initialized to zero. Otherwise, if it is determined at the test step 222 that the identifier of the received message/command matches that of one already received, then control transfers from the test step 222 to a step 226 where RT is incremented. Following the step 224 or the step 226 is a test step 228 where it is determined if the message/command from the AP 32 is requesting data (as opposed to requesting that some action be performed, like changing the clock time). If it is determined at the test step 228 that the message/command from the AP 32 is for data, then control transfers from the test step 228 to a step 232 where the sensor sends the data to the AP 32 (along with the RT value and the time stamps, discussed above). In an embodiment herein, all requests for data by the AP 32 are serviced no matter how many identical prior requests had already been serviced. Following the step 232, processing is complete.

If it is determined at the test step 228 that the message/command from the AP 32 is not a request for data, then control transfers from the test step 28 to a test step 234 where it is determined if RT is zero (first instance of message/command from the AP 32). If it is determined at the test step 234 that RT is zero, then control transfers from the test step 234 to a step 236 where the action requested by the AP 32 (e.g., change internal clock time) is performed. Following the step 236 or following the step 234 if RT does not equal zero is a step 238 where the sensor sends an acknowledgement back to the AP 32. The acknowledgement may include the value of RT, the time stamps, etc. Following the step 238, processing is complete.

Figure 10:
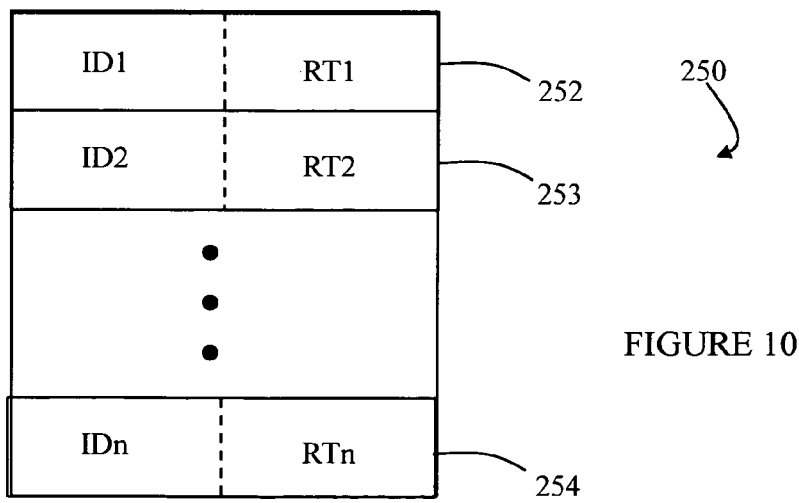
FIG. 10 is a schematic diagram illustrating a table used by a sensor to correlate identifiers and retry counts according to an embodiment of the system described herein.

Referring to FIG. 10, a table 250 that is maintained by a sensor includes a plurality of entries 252-254 that correlate different identifiers with different RT variables. For example, the entry 252 indicates that ID1 has been received by the sensor RT1 times (or RT1 plus one times, depending upon whether RT is initialized to zero or one). The table 250 may be consulted in connection with performing processing illustrated by the flow chart 220 of FIG. 9, discussed above. In an embodiment herein, the table 250 may be implemented as a linked list, although other appropriate data structures may be used. Note also that, to preserve storage space in the memory 48, a sensor may discard the oldest entries in the table 250 as more space is needed for new entries. If the identifiers are numerically sequential, then the entries having the lowest numerical value may be the oldest.

Figure 11:
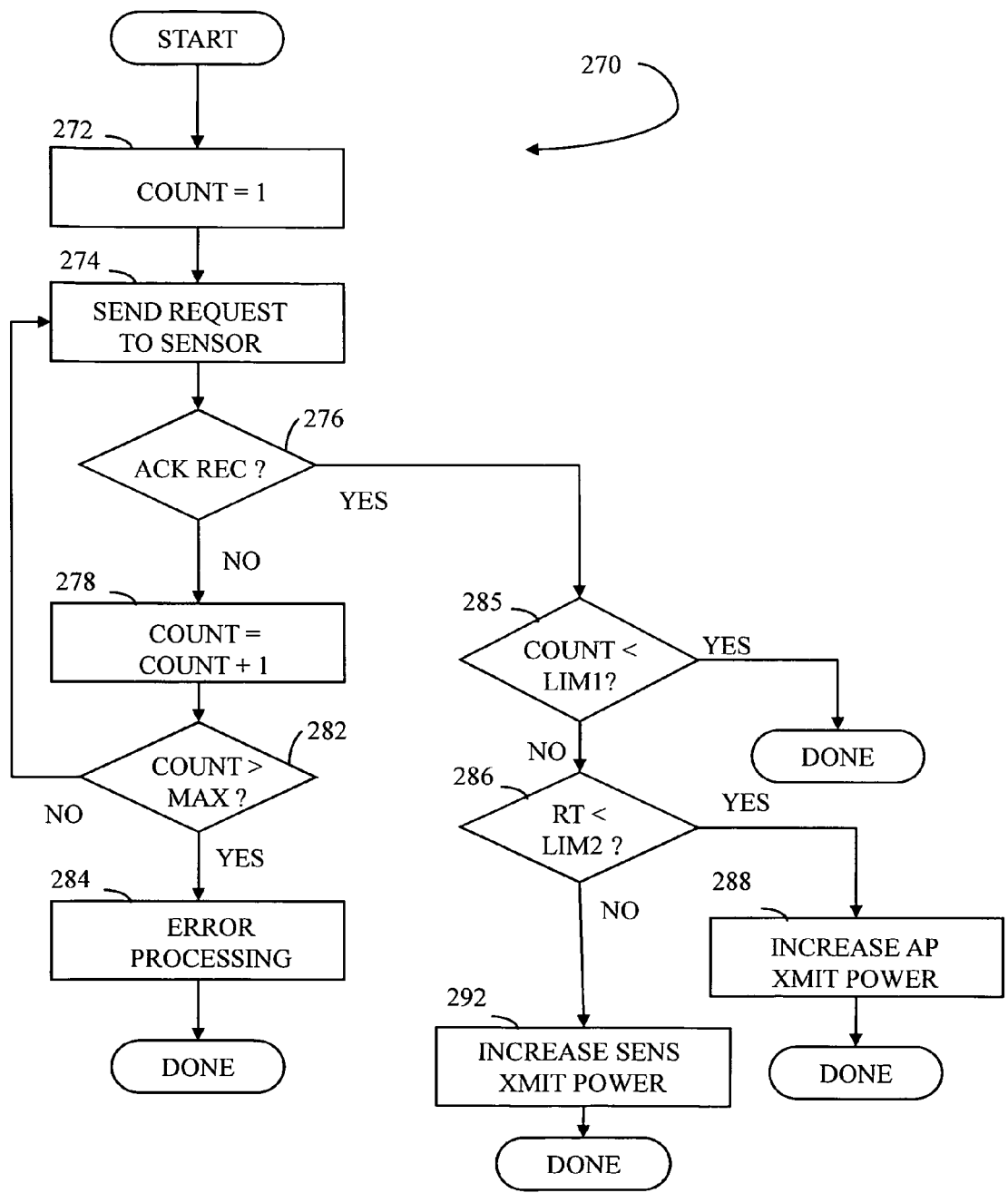
FIG. 11 is a flow chart illustrating processing performed by an AP in connection with transmission of a message/command to a sensor.

Referring to FIG. 11, a flow chart 270 illustrates steps performed by the AP 32 in connection with exchanging information with sensors and adjusting transmitting power on the AP 32 and/or a sensor. Processing begins at a first step 272 where a variable, COUNT, is set to one. The COUNT variable keeps track of how many times the AP 32 transmits the same message to the sensor. Following the step 272 is a step 274 where the message/command is sent by the AP 32. Following the step 274 is a step 276 where the AP 32 determines if the sensor has acknowledged the message/command (replied in some fashion). If not, then control transfers from the step 276 to a step 278 where the COUNT variable is incremented. Note that acknowledgement by a sensor may be explicit (acknowledge message sent) or implicit (e.g., AP 32 requests particular data and the sensor returns the requested data).

Following the step 278 is a test step 282 where it is determined if the value of the COUNT variable has exceeded some limit (i.e., has the number of attempted transmissions exceeded some limit). If so, then control transfers from the step 282 to a step 284 where appropriate error processing is performed (e.g., log error, report to user, etc.). Following the step 284, processing is complete. Note that, in some embodiments, it may be possible to increase transmission power of the AP 32 at the step 284 and then retry transmission by transferring control back to the step 272. Note also, however, that if the transmission problem is due to the sensor not using enough power to transmit back to the AP 32, then the problem will not be fixed by increasing the transmission power of the AP 32, but, instead, is fixed by having the sensor increasing its transmit power.

If it is determined at the step 276 that the sensor has acknowledged (implicitly or explicitly) the message/command from the AP 32, then control transfers from the step 276 to a test step 285 where it is determined if the value of the COUNT variable is less than a predetermined limit. Note that the limit used at the step 285 is not greater than the limit used at the step 282. The limit used at the step 285 determines if transmission between the AP 32 and the sensor occurs in a reasonable number of attempts. For example, one or two attempts would tend to indicate that the wireless link between the AP 32 and the sensor is good while a dozen attempts would tend to indicate otherwise. Of course, the limit at the step 285 may be set based on a variety of factors such as the desired retransmission rate, the desired throughput, available bandwidth, available transmission power at both the AP 32 and the sensor, etc.

If it is determined at the step 285 that the value of COUNT does not exceed the limit, then processing is complete. Otherwise, control transfers from the test step 285 to a test step 286 where the retry value returned by the sensor (RT) is examined. Note that if RT is relatively high (close to the value of COUNT), it means that most if not all of the transmissions from the AP 32 provided at the step 272 were received by the sensor and that the AP 32 did not receive most of the responses back from the sensor. Conversely, the value of RT being relatively low may indicate that most of the transmissions from the AP 32 to the sensor were not received by the sensor. Accordingly, the test at the step 286 compares the value of RT to a predetermined limit. If RT is less than the limit (relatively low), then control transfers from the test step 286 to a step 288 where the transmission power of the AP 32 is increased. Otherwise, control transfers from the test step 286 to a step 292 where the AP 32 sends a command to the sensor to cause the sensor to increase the transmission power thereof.

Note, by the way, that, in addition to the RT count returned by the sensor, it may be useful for the AP 32 to be provided with the amount of time that the sensor had been awake prior to providing a response. This way, transmissions by the AP 32 to the sensor while the sensor is sleeping will not be counted as bad transmissions. For example, if count is twelve and RT is one, the awake time value returned by the sensor may indicate that the sensor was sleeping during the first ten transmissions by the AP 32. This should be taken into account when determining data link quality. In an embodiment herein, the value of COUNT may be adjusted prior to the step 285 in order to compensate for transmissions by the AP 32 while the sensor was sleeping.

Figure 12:
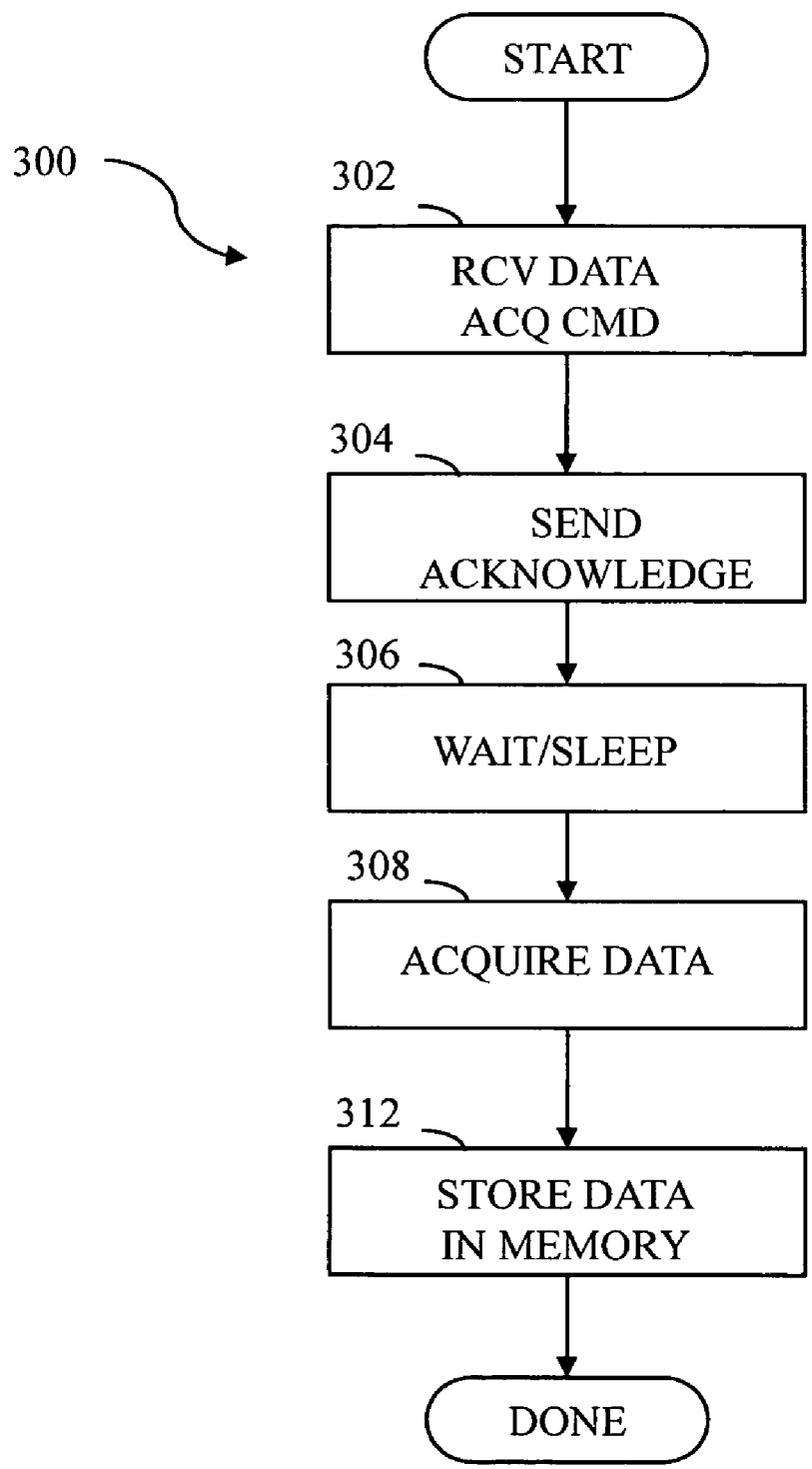
FIG. 12 is a flow chart illustrating processing performed by a sensor in connection with handling a data collection request according to an embodiment of the system described herein.

Referring to FIG. 12, a flow chart illustrates steps performed by a sensor in connection with receiving a command from the AP 32 to collect data at a particular time. Processing begins at a first step 302 where the sensor receives the command. Following the step 302 is a step 304 where the sensor sends an acknowledgement back to the AP 32. Note that receiving the data and sending an acknowledgement at the steps 302, 304 may be performed according to the processing illustrated by the flow chart 220 of FIG. 9. Following the step 304 is a step 306 where the sensor waits/sleeps until it is time to collect the data. In some embodiments, the sensor may always wait without sleeping. In other embodiments, the sensor puts itself to sleep for the necessary amount of time. In still other embodiments, the sensor may wait if the collection time is less than a predetermined amount of time in the future and put itself to sleep if the collection time is more than the predetermined amount of time in the future.

Following the step 306 is a step 308 where the sensor acquires the data. Following the step 308 is a step 312 where the sensor stores the data in its memory (for later transmission to the AP 32). Following the step 312, processing is complete. In an embodiment herein, the sensor retains collected data until the AP 32 directs the sensor to collect new data so that if there is any difficulty transmitting the data to the AP 32, the AP 32 can request retransmission. In some instances, the data may be retained only until the sensor receives an indication that all data has been received successfully by the AP 32. Such an indication may be included as a part of a sleep command from the AP 32, or there may be a dedicated command from the AP 32 allowing the sensor to power down part of its memory containing the data to save energy.

Figure 13:
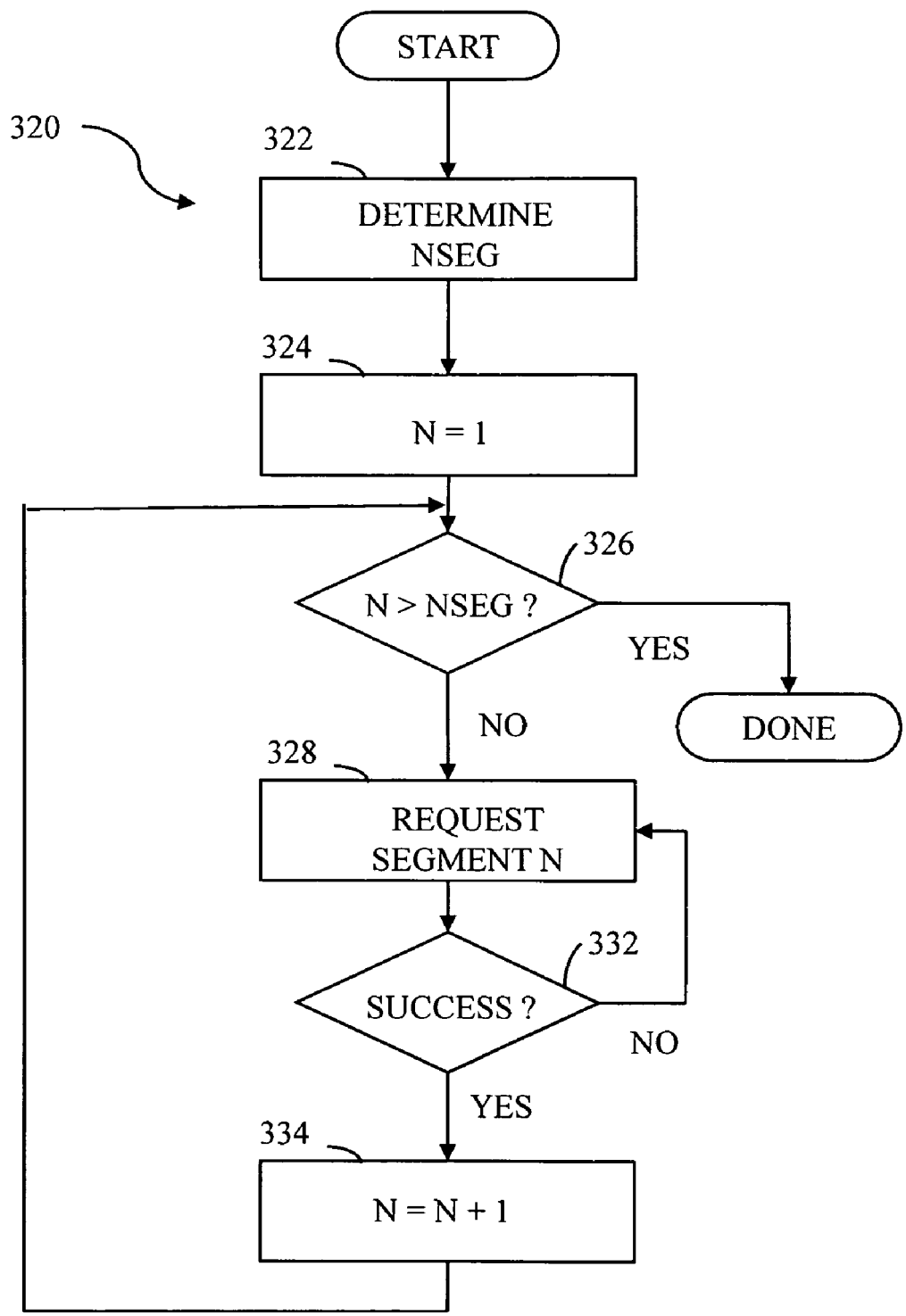
FIG. 13 is a flow chart in connection with an AP requesting collected data from a sensor according to an embodiment of the system described herein.

Referring to FIG. 13, a flow chart 320 illustrates steps performed by the AP 32 in connection with obtaining collected data from a sensor. Processing begins at a first step 322 where the AP 32 determines the number of segments (separate packets) that comprise the data. As discussed elsewhere herein, data may be broken into segments and transmitted in separate packets. The determination at the step 322 may include dividing the (expected) total amount of data by the packet size. Following the step 322 is a step 324 where an index variable, N, is set to one. The index variable, N, may be used to iterate through the data packets.

Following the step 324 is a test step 326 where it is determined if the index variable, N, is greater than the number of segments. If so, then processing is complete. Otherwise, control transfers from the step 326 to a step 328 where the AP 32 requests that the sensor transmit segment N. Following the step 328 is a test step 332 where it is determined if the AP 32 has successfully received the requested data. If not, then control loops back to the step 328 to request the data again. Note that the steps 328, 332 may be performed according to the processing illustrated by the flow chart 270 of FIG. 11. If it is determined at the step 332 that the AP 32 has successfully received the requested data, then control transfers from the test step 332 to a step 334 where the index variable, N, is incremented. Following the step 334, control transfers back to the step 326 for another iteration.

In some instances, the order of steps in the flowcharts may be modified, where appropriate. The system described herein may be implemented using the hardware described herein, variations thereof, or any other appropriate hardware capable of providing the functionality described herein. The system also includes computer software, stored in a computer-readable medium, that executes any of the steps described herein.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing wireless communication between an access point and a wireless device, comprising:
    the wireless device operating in a first reduced power mode for a first period of time, wherein the wireless device does not receive communications while operating in the first reduced power mode; and
    the wireless device operating in a full power mode for a second period of time, wherein the wireless device transitions back into the first reduced power mode in response to there being no communication from the access point to the wireless device during the second period of time, and wherein the wireless device only transmits messages in response to commands received from the access point, a particular command requesting transmission of a particular message according to an action directed by the access point.

2. A method, according to claim 1, wherein the wireless device is a wireless sensor.

3. A method, according to claim 2, wherein in response to the access point directing the wireless sensor to collect data at a particular collection time, the wireless sensor enters the first reduced power mode for a time prior to the collection time.

4. A method, according to claim 2, wherein the wireless sensor stores collected data in a memory thereof.

5. A method, according to claim 4, wherein the access point requests the wireless sensor to transmit the data from the memory.

6. A method, according to claim 1, wherein an occurrence of operation of the wireless device in the full power mode is scheduled internally by the wireless device and is not scheduled by the access point, and wherein, during the internally-scheduled occurrence of operation of the wireless device in the full power mode, the wireless device receives a command from the access point that directs the wireless device to collect data at a particular collection time.

7. A method, according to claim 1, further comprising:
the wireless device providing time stamp information to the access point; and
the access point sending a clock adjustment command to the wireless device based on the time stamp information.

8. A method, according to claim 7, wherein the time stamp information includes a time the access point sends a command to the wireless device, a time the wireless device receives the command, a time the wireless device responds to the command, and a time the access point receives a response to the command.

9. A method, according to claim 8, wherein the timestamp information is provided to the access point as part of a message sent from the wireless device that also includes data responsive to the particular command from the access point.

10. A method, according to claim 1, wherein the wireless device enters a second reduced power mode in response to there being no communication from the access point during the full power mode for a predetermined number of cycles, the second reduced power mode including longer times between full power mode cycles than said first reduced power mode.

11. A method, according to claim 10, further comprising:
the access point sending a command to the wireless device to cause the wireless device to transition into one of the reduced power modes.

12. A method, according to claim 1, wherein the wireless device retransmits previously-transmitted data only in response to a retransmission command from the access point.

13. Computer software, provided in a non-transitory computer-readable medium, that facilitates wireless communication between an access point and a wireless device, the software comprising:
executable code that causes the wireless device to operate in a first reduced power mode for a first period of time, wherein the wireless device does not receive communications while operating in the first reduced power mode;
executable code that causes the wireless device to operate in a full power mode for a second period of time, wherein the wireless device transitions back into the first reduced power mode in response to there being no communication from the access point to the wireless device during the second period of time; and
executable code that causes the wireless device to transmit messages only in response to commands received from the access point, a particular command requesting transmission of a particular message according to an action directed by the access point.

14. Computer software, according to claim 13, wherein the wireless device is a wireless sensor, and wherein, in response to the access point directing the wireless sensor to collect data at a particular collection time, executable code causes the wireless sensor to enter the first reduced power mode for a time prior to the collection time.

15. Computer software, according to claim 14 further comprising:
executable code that causes the wireless sensor to store collected data in a memory thereof.

16. Computer software, according to claim 15, further comprising:
executable code that causes the access point to request the wireless sensor to transmit the data from the memory.

17. Computer software, according to claim 16, further comprising:
executable code that causes the wireless sensor to enter a second reduced power mode in response to there being no communication from the access point during the full power mode for a predetermined number of cycles, the second reduced power mode including longer times between full power mode cycles than said first reduced power mode.

18. Computer software, according to claim 17, further comprising:
executable code that causes the access point to send a command to the wireless device to cause the wireless device to transition into one of the reduced power modes.

19. Computer software, according to claim 13, further comprising:
executable code that provides time stamp information to the access point; and
executable code that receives a clock adjustment command from the access point, wherein the clock adjustment command is provided based on the time stamp information.

20. Computer software, according to claim 19, wherein the time stamp information includes a time the access point sends a command to the wireless device, a time the wireless device receives the command, a time the wireless device responds to the command, and a time the access point receives a response to the command.

21. Computer software, according to claim 19, wherein the timestamp information is provided to the access point as part of a message sent from the wireless device that also includes data responsive to the particular command from the access point.

22. Computer software, according to claim 13, further comprising:
executable code that causes the wireless device to retransmit previously-transmitted data only in response to a retransmission command from the access point.

23. Computer software, according to claim 13, wherein an occurrence of operation of the wireless device in the full power mode is scheduled internally by the wireless device and is not scheduled by the access point, and wherein, during the internally-scheduled occurrence of operation of the wireless device in the full power mode, the wireless device receives a command from the access point that directs the wireless device to collect data at a particular collection time.

24. A wireless sensor, comprising:
sensing components;
a processor coupled to the sensing components;
a transceiver coupled to the processor, wherein the wireless sensor operates in a first reduced power mode for a first period of time in which the wireless sensor does not receive communications while operating in the first reduced power mode, the wireless sensor operates in a full power mode for a second period of time, wherein the wireless device transitions back into the first reduced power mode in response to there being no received wireless communication during the second period of time, and wherein the wireless sensor only transmits messages in response to received commands, a particular command requesting transmission of a particular message according to an action indicated by the particular command.

25. A wireless sensor, according to claim 24, further comprising:
a memory, coupled to the processor and the sensor components, wherein data collected by the wireless sensor is stored in the memory.

26. A wireless sensor, according to claim 25, wherein the wireless sensor enters a second reduced power mode in response to there being no received wireless communication during the full power mode for a predetermined number of cycles, the second reduced power mode including longer times between full power mode cycles than said first reduced power mode.

27. A wireless sensor, according to claim 24, wherein an occurrence of operation of the wireless sensor in the full power mode is scheduled internally by the wireless sensor and, during the internally-scheduled occurrence of operation of the wireless sensor in the full power mode, the wireless sensor receives a transmission that directs the wireless sensor to collect data at a particular collection time, wherein, in response to the transmission, the wireless sensor enters the first reduced power mode for the time prior to the particular collection time and collects data at the particular collection time.

\* \* \* \* \*